US011919180B2

(12) United States Patent
Seferi

(10) Patent No.: US 11,919,180 B2
(45) Date of Patent: Mar. 5, 2024

(54) SLIDE LEVERAGE SCISSORS

(71) Applicant: Acme United Corporation, Shelton, CT (US)

(72) Inventor: Nicholas L. Seferi, Southbury, CT (US)

(73) Assignee: Acme United Corporation, Shelton, CT (US)

( * ) Notice: Subject to any disclaimer, the term of this patent is extended or adjusted under 35 U.S.C. 154(b) by 127 days.

(21) Appl. No.: 17/585,673

(22) Filed: Jan. 27, 2022

(65) Prior Publication Data

US 2023/0234249 A1 Jul. 27, 2023

(51) Int. Cl.
*B26B 13/28* (2006.01)

(52) U.S. Cl.
CPC .................................. *B26B 13/285* (2013.01)

(58) Field of Classification Search
CPC .................................................... B26B 13/285
USPC ........................................................... 30/254
See application file for complete search history.

(56) References Cited

U.S. PATENT DOCUMENTS 4,761,883 A * 8/1988 Mertens ................ B26B 13/285
34/239
5,263,254 A * 11/1993 Orthey .................... B26B 13/28
30/252
5,950,314 A * 9/1999 Chang .................. A01G 3/0251
30/244
8,661,690 B2 * 3/2014 Murphy .................. B26B 13/22
76/82.2

* cited by examiner

*Primary Examiner* — Omar Flores Sanchez
(74) *Attorney, Agent, or Firm* — Alix, Yale & Ristas, LLP

(57) ABSTRACT

Disclosed herein is a cutting device. The cutting device includes a first subassembly, a second subassembly, and a fastener. The first subassembly has a first blade and a handle. The first blade includes a circular opening. The second subassembly has a second blade and a handle. The second blade includes an elongated opening. The fastener is connected between the circular opening and the elongated opening.

14 Claims, 9 Drawing Sheets

SLIDE LEVERAGE SCISSORS

TECHNICAL FIELD

The invention relates to a cutting tool and, more particularly, to a pair of lever-like scissors which are pivotally joined to provide a cutting tool.

BACKGROUND

Scissor technology is well developed and numerous proposals have been advanced for implementing a various configurations of lever-like scissor assemblies. It has long been desirable to provide configurations having improved cutting force without impacting ease of use. Accordingly, there is a need to provide an improved cutting tool, while maintaining robust and reliable product configurations.

SUMMARY

In accordance with one aspect of the invention, a cutting device is disclosed. The cutting device includes a first subassembly, a second subassembly, and a fastener. The first subassembly has a first blade and a handle. The first blade includes a circular opening. The second subassembly has a second blade and a handle. The second blade includes an elongated opening. The fastener is connected between the circular opening and the elongated opening.

In accordance with another aspect of the invention, a cutting device is disclosed. The cutting device includes a first subassembly and a second subassembly. The first subassembly has a first blade and a handle. The second subassembly has a second blade, a handle, and a support member. The support member is connected between the first subassembly and the second subassembly.

BRIEF DESCRIPTION OF THE DRAWINGS

The foregoing aspects and other features of the invention are explained in the following description, taken in connection with the accompanying drawings, wherein.

DETAILED DESCRIPTION

Figure 1:
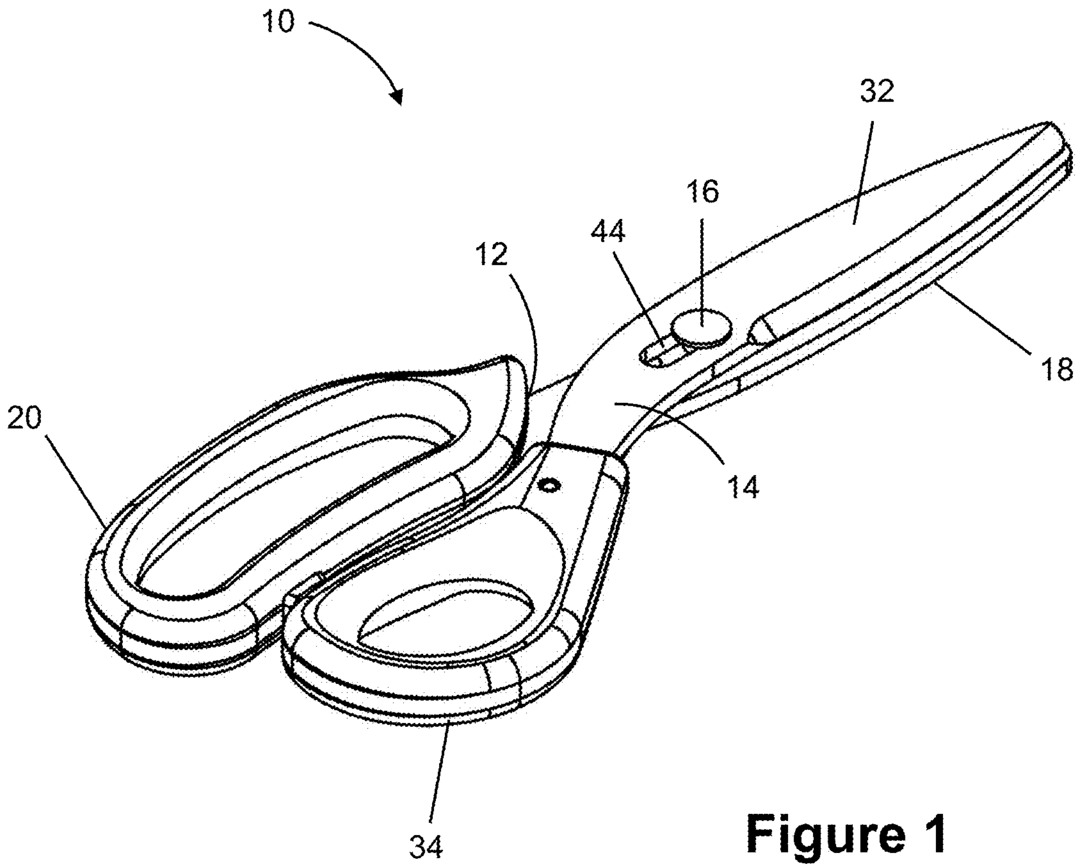
FIG. 1 is a perspective view of a cutting device incorporating features of the various exemplary embodiments of the invention.
Figure 2:
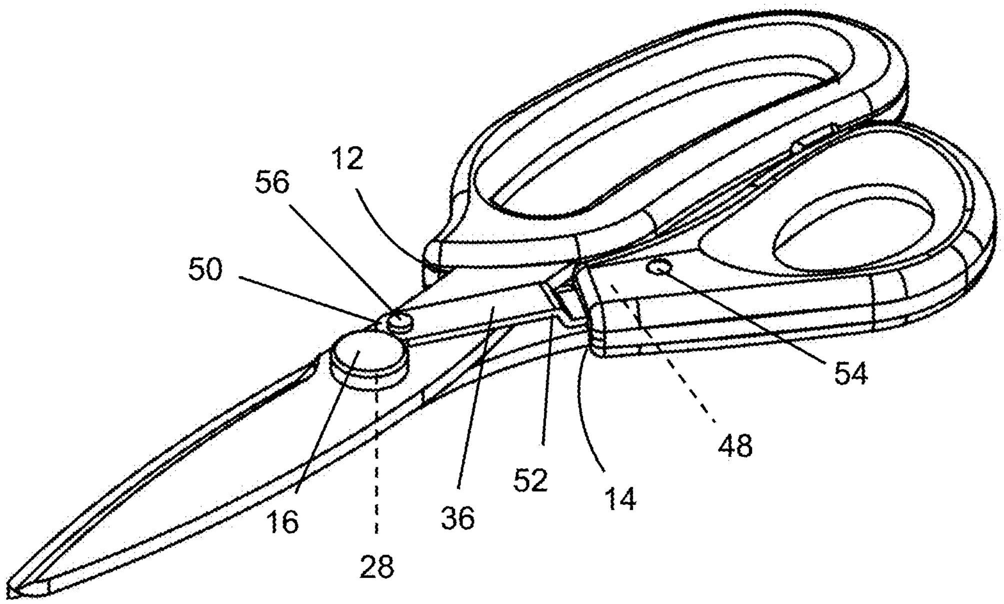
FIG. 2 is another perspective view of the cutting device shown in FIG. 1.
Figure 3:
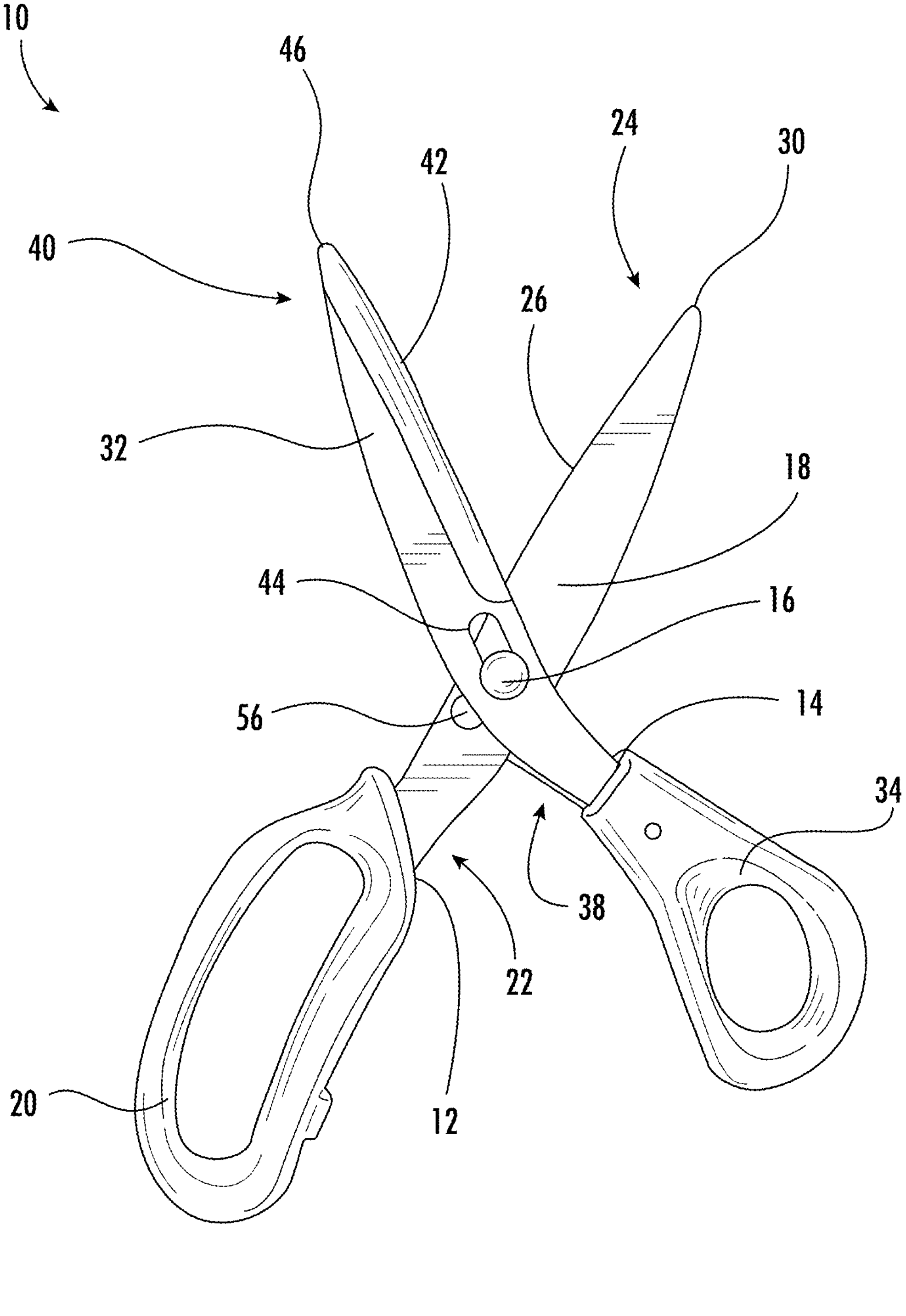
FIG. 3 is a top view of the cutting device shown in FIG. 1 in an open position.
Figure 4:
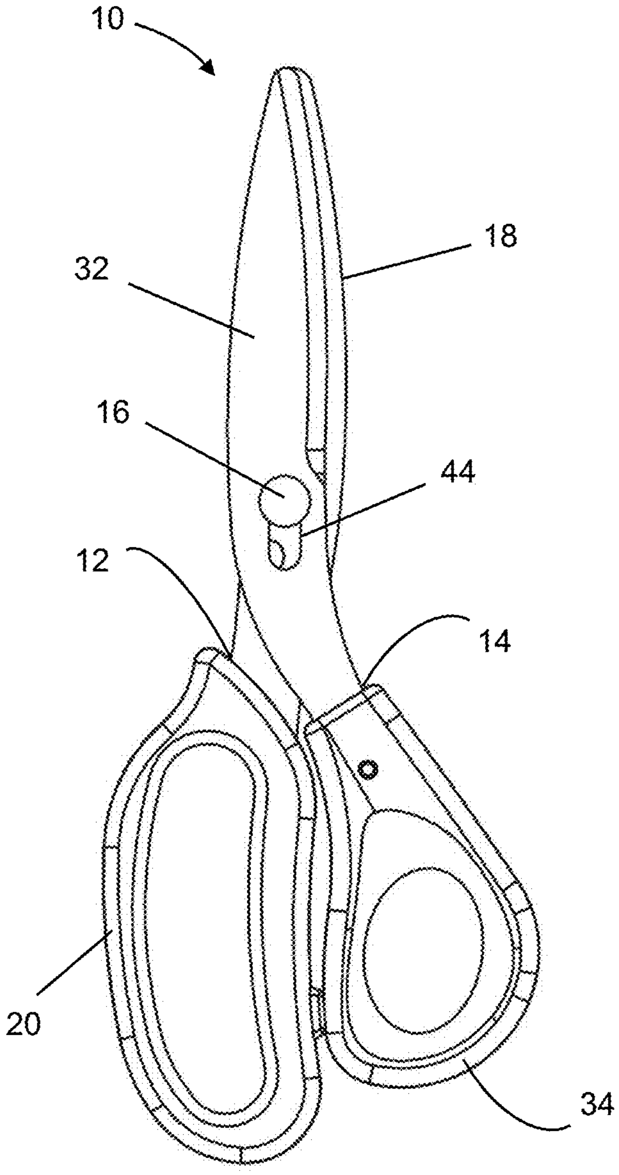
FIG. 4 is a top plan view of the cutting device shown in FIG. 1.
Figure 5:
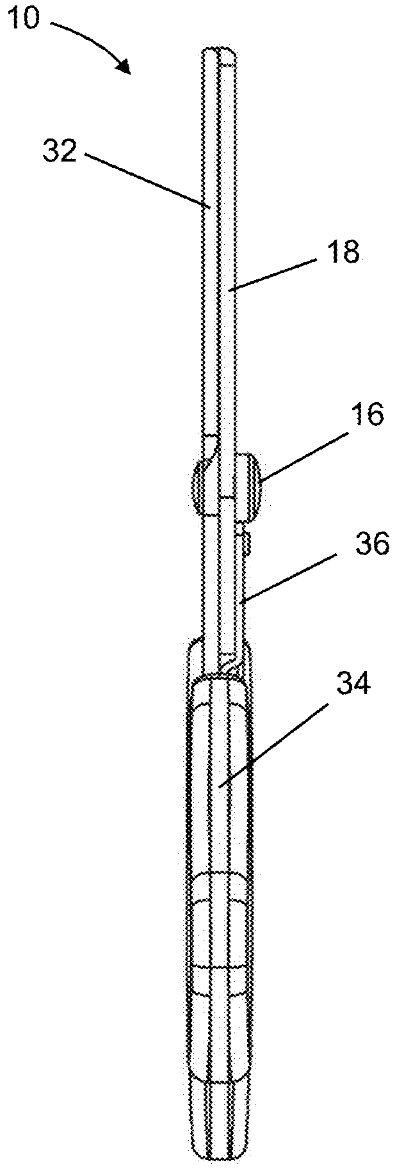
FIG. 5 is a side view of the cutting device shown in FIG. 1.
Figure 6:
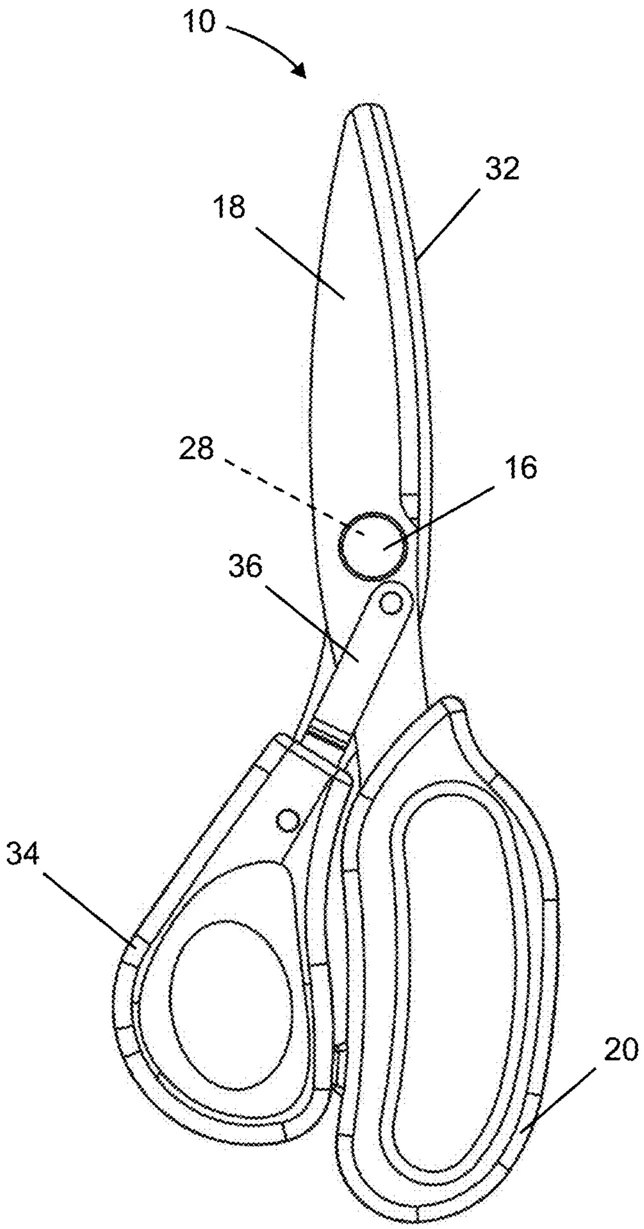
FIG. 6 is a bottom plan view of the cutting device shown in FIG. 1.
Figure 7:
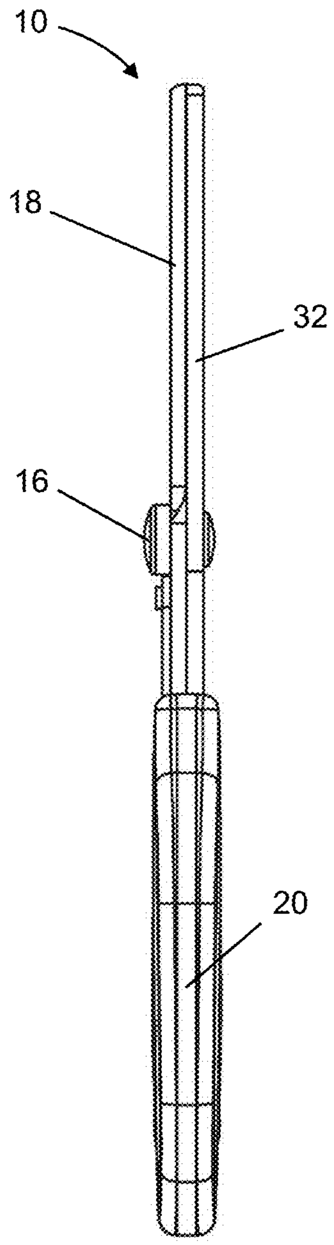
FIG. 7 is another side view of the cutting device shown in FIG. 1.

Referring to FIG. 1, there is shown a perspective view of a cutting tool 10 (such as a pair of scissors, for example) incorporating features of the invention. Although the invention will be described with reference to the exemplary embodiment shown in the drawings, it should be understood that the invention can be embodied in many alternate forms of embodiments. In addition, any suitable size, shape or type of elements or materials could be used.

The scissors 10 include a first subassembly 12, a second subassembly 14, and a fastening member 16 pivotably connecting the first subassembly 12 to the second subassembly 14. The fastening member 16 may be a threaded fastener (such as a screw, for example), a rivet, or any other suitable fastening member capable of providing for a pivotable connection between the first subassembly 12 and the second subassembly 14.

Referring now also to FIGS. 2-7, the first subassembly 12 includes a first blade 18 and a finger handle 20 attached thereto. The first blade 18 comprises a proximal end 22, a distal end 24, a cutting portion 26, and an opening 28. The proximal end 22 is connected to the finger handle 20. The finger handle is suitably sized and shaped to receive the user's fingers. The opening 28 is located between the proximal end 22 and the distal end 24. The opening comprises a substantially circular shape. The cutting portion 26 is adjacent to the opening 28 and extends toward the tapered distal end 24 where the blade tip 30 is located.

The second subassembly 14 includes a second blade 32, a thumb handle 34 attached thereto, and a support member 36. The second blade 32 comprises a proximal end 38, a distal end 40, a cutting portion 42, and an elongated opening 44. The proximal end 38 is connected to the thumb handle 34. The thumb handle 34 is suitably sized and shaped to receive the user's thumb. The elongated opening 44 is located between the proximal end 38 and the distal end 40. The elongated opening 44 comprises a general slotted or general racetrack shape. The cutting portion 42 is adjacent to the elongated opening 44 and extends toward the tapered distal end 40 where the blade tip 46 is located.

The support member 36 comprises a first end 48, a second end 50, and a stepped portion 52 between the first end 48 and the second end 50. The first end 48 is connected to the proximal end 38 of the second blade 32 and the thumb handle 34 by a fastener 54. The fastener 54 may be a threaded fastener (such as a screw, for example), a rivet, or any other suitable fastening member. According to some embodiments, the fastener may extend through corresponding openings of the proximal end 38, the first end 48, and the thumb handle 34. According to some alternate embodiments, the fastener may extend through only the first end 48 and the thumb handle 34. According to other alternate embodiments, any other suitable configuration for connecting the first end between the proximal end 38 and the thumb handle may be provided. The second end 50 is pivotably connected to the first blade 18 (proximate the fastening member 16) by a fastener 56 (which extends through corresponding openings of the second end 50 and the first blade 18). The fastener 56 may be a threaded fastener (such as a screw, for example), a rivet, or any other suitable fastening member.

The stepped portion 52 is configured to provide a clearance for the thickness of the first blade 18, as the first end 48 of the support member 36 is adjacent an inner side of the second blade 32, and the second end 50 of the support member 36 is adjacent an outer side of the first blade 18. The fastener 56 extends through the second end 50 of the support member 36 and the first blade 18 such that a portion of the first blade 18 pivots through the clearance provided by the stepped portion 52 when the first subassembly pivots relative to the second subassembly (about the fastening member 16). With this configuration, the elongated opening (or hole) 44 allows for a moving pivot point between the second subassembly and the first subassembly. For example, in FIG. 1 the scissors are shown in a closed position wherein the fastening member 16 is at the end of the elongated opening 44 closest to the cutting portions of the blades, and the in FIG. 3 the scissors are shown in an open position wherein the fastening member 16 is at the end of the elongated opening 44 closest to the handles 20, 34.

While various exemplary embodiments of the invention have been described in connection with the first end of the support member being connected to the second blade, the second end of the support member being connected to the first blade, and the elongated opening being located on the second blade, one skilled in the art will appreciate that the various exemplary embodiments of the disclosure are not necessarily so limited and that alternate embodiments may provide for the first end of the support member being connected to the first blade, the second end of the support member being connected to the second blade, and the elongated opening being located on the first blade.

Technical effects of any one or more of the exemplary embodiments provide a for a cutting device that has a moving pivot point. Compared to conventional scissors, this allows for a better cutting arc and higher leverage from the middle to tip of the scissor.

Various manual and automatic tests have been conducted which measured the mechanical advantage and cutting performance of the cutting device 10 alongside other conventional scissors. The results of these tests indicated that the cutting device 10 had the best tip cutting performance (lowest average max tip cutting force) and better mechanical advantage when compared to the other conventional scissors.

Figure 8:
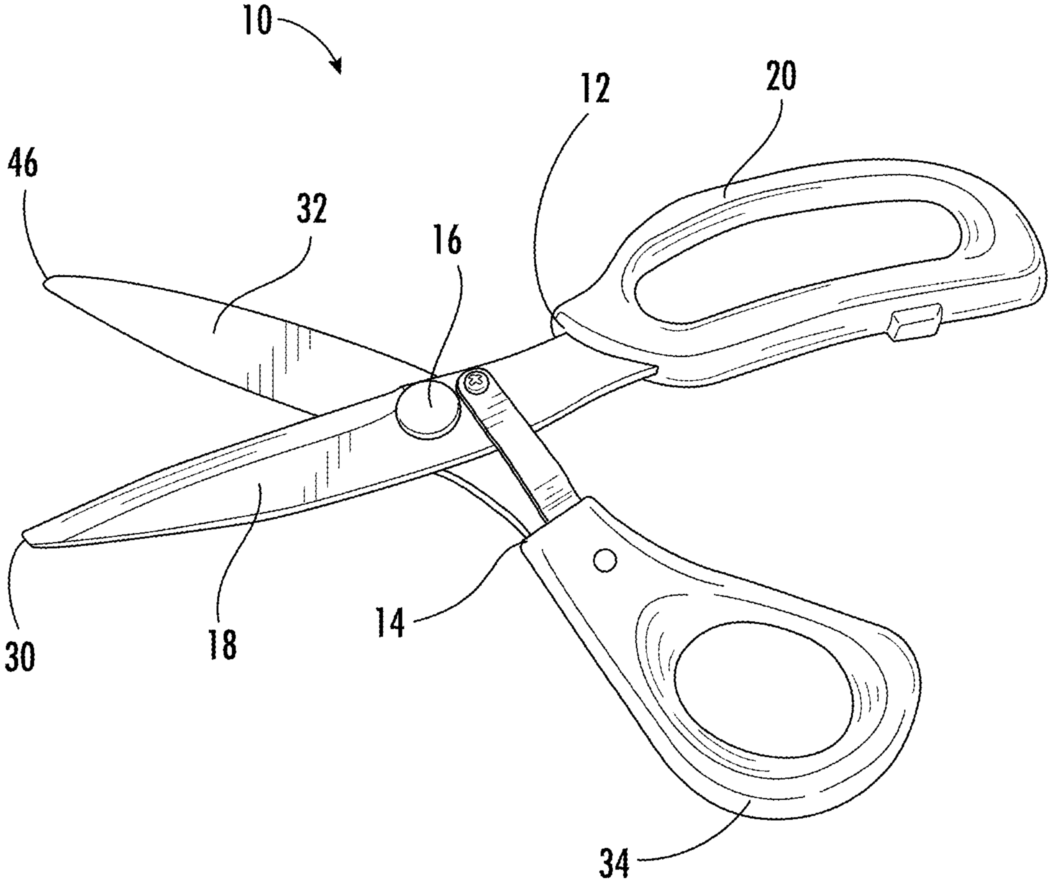
FIG. 8 is a top view of the cutting device shown in FIG. 1 in a manual testing fixture.
Figure 9:
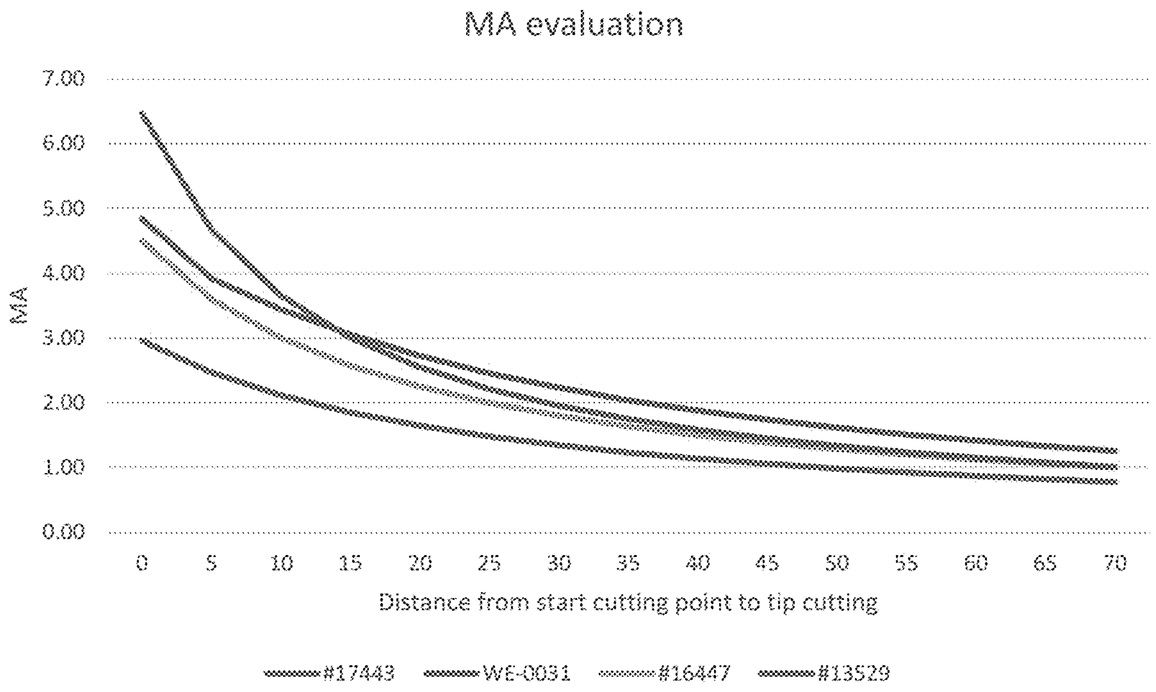
FIG. 9 is a mechanical advantage evaluation plot showing testing results for the cutting device shown in FIG. 1 (compared to conventional scissors)

Referring now also to FIG. 8, there is shown a manual testing fixture (including a clamp securing the finger handle 20) for measuring the cutting force of the cutting device 10. The testing is configured to measure the force applied to the thumb handle to start the shearing off of one piece of 250 gsm kraft paper at different points along the scissor blades, from the most open position of the scissors 10 to tip cutting. FIG. 9 illustrates the mechanical advantage (MA) evaluation of this manual testing by measuring the mechanical advantage at different distances from the starting (most open) cutting point (i.e. proximate the pivot point at the fastening member 16) to the tip cutting (i.e. proximate the blade tips 30, 46). As shown in FIG. 9, the cutting device 10 (represented by “WE-0031”) has a better mechanical advantage (MA) compared with the other conventional scissors (represented by #17443, #16447, and #13529). In particular, it can be seen that the cutting device 10 (WE-0031) needed lesser force on the tip to cut the same material compared with other scissors, as the mechanical advantage value is approximately 1.26 at the 70 mm distance (and the mechanical advantage values of the conventional scissors are approximately 1.00 or less at the 70 mm distance).

Figure 10:
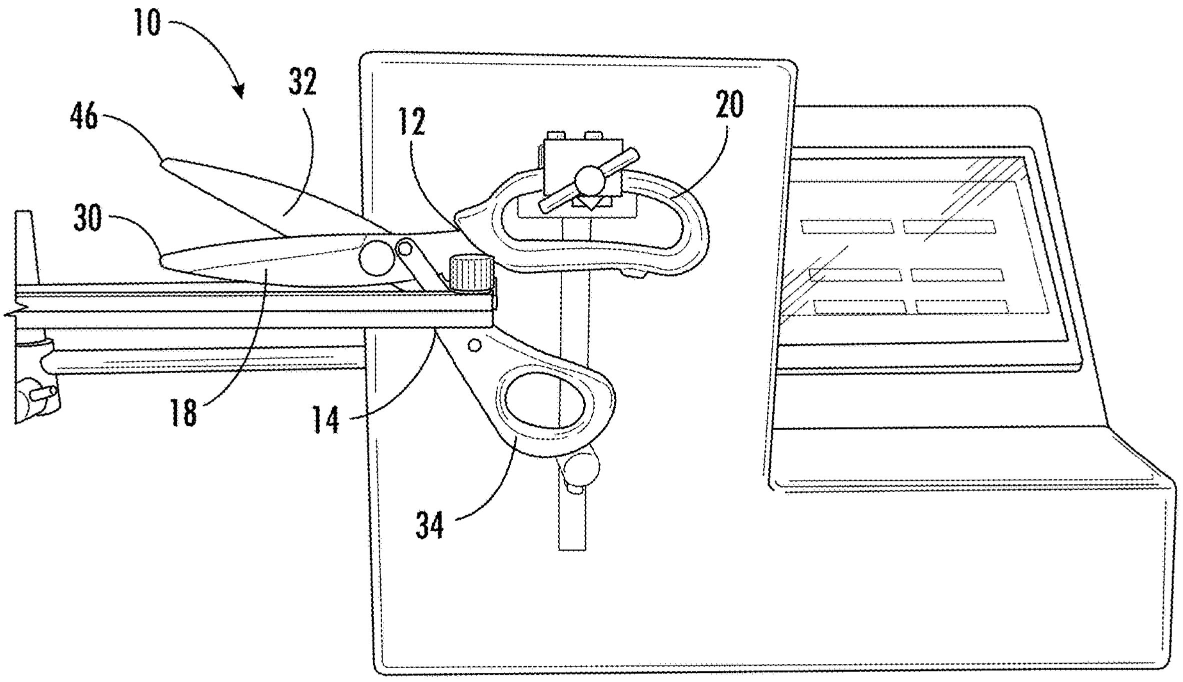
FIG. 10 is a front view of the cutting device shown in FIG. 1 in an automatic testing fixture.
Figure 11:
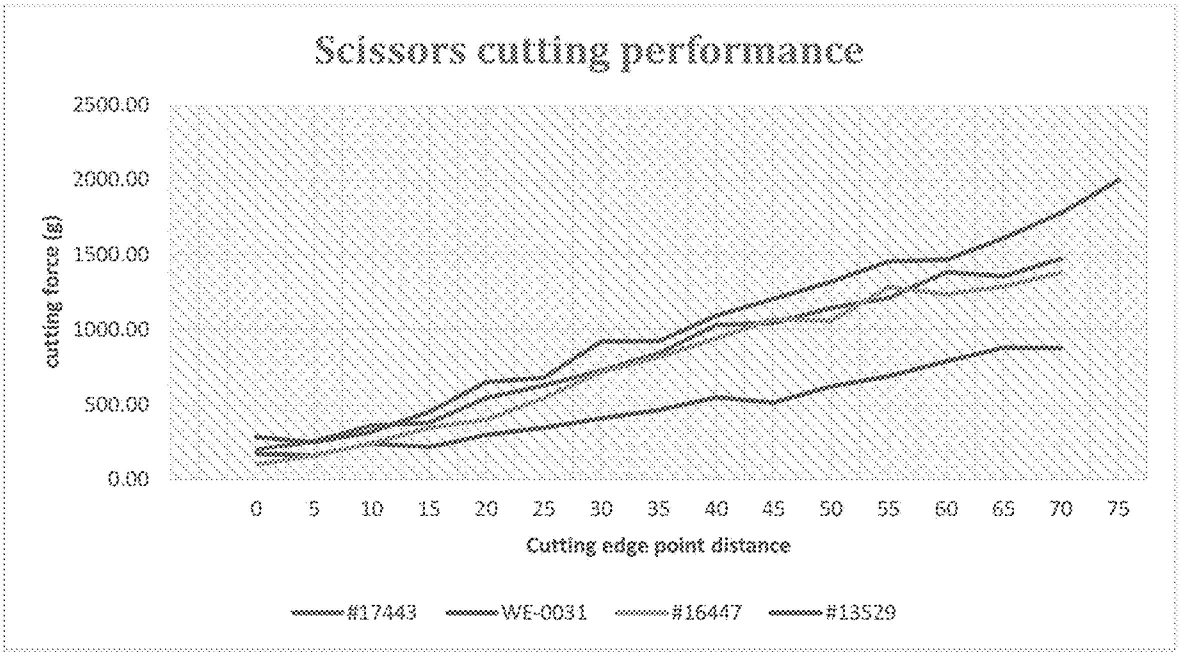
FIG. 11 is a cutting performance evaluation plot showing testing results for the cutting device shown in FIG. 1 (compared to conventional scissors).

Referring now also to FIG. 10, there is shown an automatic testing fixture for measuring the cutting force of the cutting device 10. With the automatic testing fixture, the scissors 10 are clamped onto the fixture such that the finger handle 20 is stationary and a force can be applied to the thumb handle (force applied so as to move the thumb handle up to cut the kraft paper). The automatic testing fixture is configured to measure the force along the cutting travelling distance of the scissors 10. FIG. 11 illustrates the cutting performance evaluation of this automatic testing by measuring the cutting force at different distances from the starting (most open) cutting point (i.e. proximate the pivot point at the fastening member 16) to the tip cutting (i.e. proximate the blade tips 30, 46). As shown in FIG. 11, the cutting device 10 (represented by “WE-0031”) required the smallest force to cut the kraft paper along most of the cutting-edge travel distance when compared to the other conventional scissors (represented by #17443, #16447, and #13529). Additionally, it can be seen that the cutting device 10 (WE-0031) required only about 877 units of cutting force at the 70 mm distance, and the conventional scissors required approximately 1400 or more units of cutting force at the 70 mm distance.

It should be understood that components of the invention can be operationally coupled or connected and that any number or combination of intervening elements can exist (including no intervening elements). The connections can be direct or indirect and additionally there can merely be a functional relationship between components.

Below are provided further descriptions of various non-limiting, exemplary embodiments. The below-described exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

In one exemplary embodiment, cutting device comprising: a first subassembly having a first blade and a handle, wherein the first blade comprises a circular opening; a second subassembly having a second blade and a handle, wherein the second blade comprises an elongated opening; and a fastener connected between the circular opening and the elongated opening.

A cutting device as above, wherein the elongated opening is between a cutting portion of the second blade and the handle of the second subassembly.

A cutting device as above, wherein the circular opening is between a cutting portion of the first blade and the handle of the first subassembly.

A cutting device as above, wherein the second subassembly further comprises a support member, wherein the support member is connected between the first subassembly and the second subassembly.

A cutting device as above, wherein one end of the support member is pivotably connected to the first blade.

A cutting device as above, wherein an opposite end of the support member is connected between a proximal end of the second blade and the handle of the second subassembly.

A cutting device as above, wherein the support member comprises a step, wherein the step is configured to provide clearance for the first blade.

A cutting device as above, wherein the first blade is between the support member and the second blade.

A cutting device as above, wherein the first blade and the second blade each comprise a first side and a second side, wherein the cutting device is configured such that the first sides contact each other, wherein a first end of the support member is connected to the first side of the second blade, and wherein a second opposite end of the support member is connected to the second side of the first blade.

In another exemplary embodiment, a cutting device comprising: a first subassembly having a first blade and a handle; and a second subassembly having a second blade, a handle, and a support member, wherein the support member is connected between the first subassembly and the second subassembly.

A cutting device as above, wherein one end of the support member is pivotably connected to the first blade.

A cutting device as above, wherein an opposite end of the support member is connected between a proximal end of the second blade and the handle of the second subassembly.

A cutting device as above, wherein the support member comprises a step, wherein the step is configured to provide clearance for the first blade.

A cutting device as above, wherein the first blade is between the support member and the second blade.

A cutting device as above, wherein the first blade and the second blade each comprise a first side and a second side, wherein the cutting device is configured such that the first sides contact each other, wherein a first end of the support member is connected to the first side of the second blade, and wherein a second opposite end of the support member is connected to the second side of the first blade.

A cutting device as above, wherein the cutting device further comprises a fastener, wherein the first blade further comprises a circular opening, wherein the second blade further comprises an elongated opening, and wherein the fastener is connected between the circular opening and the elongated opening.

A cutting device as above, wherein the elongated opening is between a cutting portion of the second blade and the handle of the second subassembly.

A cutting device as above, wherein the circular opening is between a cutting portion of the first blade and the handle of the first subassembly.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. A cutting device comprising:

a first subassembly having a first blade and a handle, wherein the first blade comprises a circular opening;

a second subassembly having a second blade and a handle, wherein the second blade comprises an elongated opening;

a support member connected between the first subassembly and the second subassembly, wherein one end of the support member is pivotably connected to the first blade; and a fastener connected between the circular opening and the elongated opening.

2. A cutting device as in claim 1, wherein the elongated opening is between a cutting portion of the second blade and the handle of the second subassembly.

3. A cutting device as in claim 2, wherein the circular opening is between a cutting portion of the first blade and the handle of the first subassembly.

4. A cutting device as in claim 1, wherein an opposite end of the support member is connected between a proximal end of the second blade and the handle of the second subassembly.

5. A cutting device as in claim 1, wherein the support member comprises a step, wherein the step is configured to provide clearance for the first blade.

6. A cutting device as in claim 1, wherein the first blade is between the support member and the second blade.

7. A cutting device as in claim 1, wherein the first blade and the second blade each comprise a first side and a second side, wherein the cutting device is configured such that the first sides contact each other, wherein a first end of the support member is connected to the first side of the second blade, and wherein a second opposite end of the support member is connected to the second side of the first blade.

8. A cutting device comprising:

a first subassembly having a first blade and a handle; and a second subassembly having a second blade, a handle, and a support member, wherein the support member is connected between the first subassembly and the second subassembly, the first blade is between the support member and the second blade, and the support member comprises a step configured to provide clearance for the first blade.

9. A cutting device as in claim 8, wherein one end of the support member is pivotably connected to the first blade.

10. A cutting device as in claim 9, wherein an opposite end of the support member is connected between a proximal end of the second blade and the handle of the second subassembly.

11. A cutting device as in claim 8, wherein the first blade and the second blade each comprise a first side and a second side, wherein the cutting device is configured such that the first sides contact each other, wherein a first end of the support member is connected to the first side of the second blade, and wherein a second opposite end of the support member is connected to the second side of the first blade.

12. A cutting device as in claim 8, wherein the cutting device further comprises a fastener, wherein the first blade further comprises a circular opening, wherein the second blade further comprises an elongated opening, and wherein the fastener is connected between the circular opening and the elongated opening.

13. A cutting device as in claim 12, wherein the elongated opening is between a cutting portion of the second blade and the handle of the second subassembly.

14. A cutting device as in claim 12, wherein the circular opening is between a cutting portion of the first blade and the handle of the first subassembly.

* * * * *